(No Model.)
E. G. ACHESON.
CALELECTRIC GENERATOR.
No. 407,762. Patented July 30, 1889.
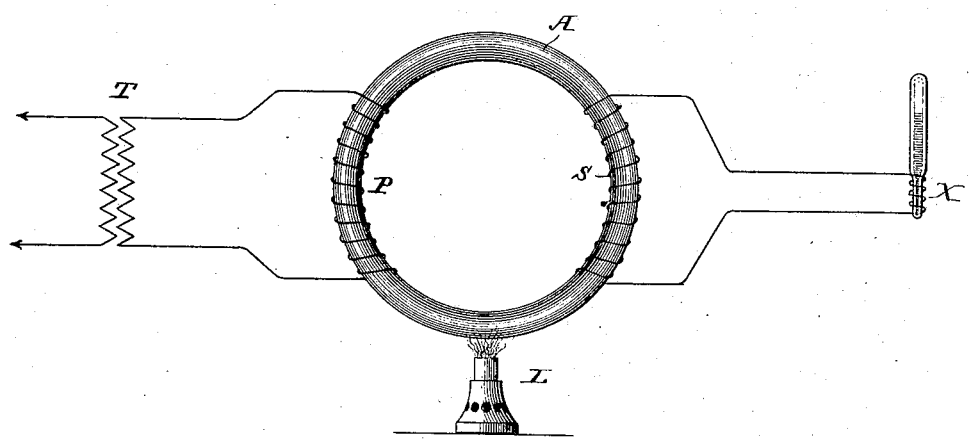
Witnesses
Jno. G. Hinkel Jr.
Charles H. Morris Jr.
Inventor
E. G. Acheson
By his Attorneys
Foster & Freeman

UNITED STATES PATENT OFFICE.

EDWARD G. ACHESON, OF PITTSBURG, PENNSYLVANIA.

CALELECTRIC GENERATOR.

SPECIFICATION forming part of Letters Patent No. 407,762, dated July 30, 1889.

Application filed April 19, 1889. Serial No. 307,825. (No model.)

*To all whom it may concern:*

Be it known that I, EDWARD G. ACHESON, a citizen of the United States, residing at Pittsburg, Allegheny county, State of Pennsylvania, have invented a new and useful Improvement in Calelectric Generators, of which the following is a specification.

My invention has for its object the generation of electricity from heat, or the conversion of heat energy into electric or magnetic energy, or the adding of electric energy to a current already existing and independently generated; and my invention consists in new apparatus for carrying out this object, substantially as hereinafter set forth.

In my patent, No. 375,408, dated December 27, 1887, I describe and claim a method of converting heat energy into electric energy, consisting in causing heat-lines to traverse an electric conductor and produce a magnetic whirl, cutting said heat-lines, and thereby convert the heat energy into electric energy, and my present invention is an improvement upon the broad idea therein set forth and the carrying forward of that invention by means of other apparatus.

In the accompanying drawing I have shown diagrammatically one form of the improved means I have adopted for carrying out my invention.

In the diagram, T represents a transformer or other source of an alternating, interrupted, or varying current of electricity.

A represents a mass of magnetic material, in this instance shown formed in the shape of a ring, to make a closed magnetic circuit, although I do not limit myself to this particular form.

P is a coil surrounding a portion of the mass of magnetic material and connected in circuit with the variable-current transformer.

S is a secondary coil arranged in proper or inductive relation to the magnetic mass (in this case surrounding a portion of the ring) and included in the circuit in which the work to be performed by the current is carried on.

X is a translating device, which may be of any of the various well-known forms, and, as indicated in the present instance, is a coil arranged about the bulb of a thermometer or other heat-measure, and L is a source of heat, (shown in this diagram as a lamp, and arranged in relation to the mass of magnetic material so as to heat the same.)

With an apparatus arranged as above indicated and having a given current at T, with the source of heat removed, I find registered on the translating device X a certain value representing the electric energy traversing the coil S and its circuit, and this may be measured and determined by various apparatus. Now, when the source of heat L is arranged in proper position to cause the heat-currents therefrom to impinge upon the mass of magnetic material, with the source of energy at T the same, I find that the translating device X shows an increased value for the electric energy in the coil S and its connections, and it is evident that the difference between the two readings is the true measurement of the increased energy in the circuit, and is caused by the heat.

In my patent above referred to I have attributed the increased electric energy in the translating device to be the result of a conversion of a portion of the heat energy applied to the apparatus into electric energy, and this may be the mode of operation in the present instance. It would appear, however, that if heat can be converted directly into electricity it should also be possible to produce magnetism from heat energy, and if this is the case the application of the heat energy to the magnetic material will result in an increased magnetic state of the magnetic mass, which will react upon the coil of wire surrounding the mass and produce therein an electric current, which will represent a part of the energy of the heat. While I have not yet been able to clearly demonstrate this fact, I have demonstrated fully that the application of heat in the manner described does produce a material increase in the current flowing through the coil S and its connections, and whether it is the result of one conversion or another is immaterial, so far as the apparatus is concerned, and I do not confine myself to any particular theory.

I have made many and various demonstrations of the operativeness of the apparatus embracing the general features described, but embodied in different specific forms, many of which will readily suggest themselves to those skilled in the art, and I do not therefore confine my invention to those indicated.

What I claim is—

1. The combination of an electric conductor conveying a current of changing value, a mass of material magnetized thereby, and a source of heat arranged to influence said mass, substantially as described.

2. The combination of an electric conductor conveying a current of changing value, a mass of magnetic material magnetized by said current, a source of heat arranged to influence said mass, and a second electric conductor, including a translating device and arranged within the influence of the magnetic mass, substantially as described.

In testimony whereof I have signed my name to this specification in the presence of two subscribing witnesses.

EDWARD G. ACHESON.

Witnesses:
 JOHN G. ANDREWS,
 JAMES BRYAR.